(12) United States Patent
Piper et al.

(10) Patent No.: US 7,299,218 B2
(45) Date of Patent: Nov. 20, 2007

(54) SYSTEM AND METHOD FOR MULTIPLE-THREADED ACCESS TO A DATABASE

(75) Inventors: Richard Matthew Piper, Pakenham (CA); Stephen Edgar Ellis, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 524 days.

(21) Appl. No.: 10/195,494

(22) Filed: Jul. 16, 2002

(65) Prior Publication Data
US 2003/0112742 A1 Jun. 19, 2003

(30) Foreign Application Priority Data
Dec. 19, 2001 (CA) .................................. 2365433

(51) Int. Cl.
*G06F 17/30* (2006.01)
(52) U.S. Cl. ............... 707/2; 707/4; 707/10; 707/100; 707/102
(58) Field of Classification Search ............ 707/2, 707/4, 10, 100, 102
See application file for complete search history.

(56) References Cited

U.S. PATENT DOCUMENTS 6,289,334 B1 * 9/2001 Reiner et al. ................. 707/3
6,804,663 B1 * 10/2004 Delo ............................. 707/3
6,834,279 B1 * 12/2004 Chiang ......................... 707/2
2002/0143751 A1 * 10/2002 Chow et al. .................. 707/3

OTHER PUBLICATIONS

Microsoft Press, Microsoft Press Computer Dictionary Third Edition, Microsoft Press, copyright 1997 by Microsoft Corporation, pp. 339 and 404.*

* cited by examiner

*Primary Examiner*—Hung Pham
(74) *Attorney, Agent, or Firm*—Marks & Clerk; Richard J. Mitchell (57) ABSTRACT

The invention provides a system and method of retrieving data associated with a file from a database by a field name into local memory. It comprises calculating an address reference for a storage location in the local memory for the data; fetching the data from the database; and utilizing the address reference to map the data to an address in the local memory. The address reference is an offset value from a base address of the storage location. Several files may be accessed using a cross reference table containing pointers to field tables. Entries in the cross reference table point to a field table. Each field table is a list of fields associated with the file. Each entry in the field table is a calculated offset value providing an address offset of a particular field from the base address of the file.

17 Claims, 9 Drawing Sheets

SYSTEM AND METHOD FOR MULTIPLE-THREADED ACCESS TO A DATABASE

FIELD OF THE INVENTION

The field of the invention relates a system and method for accessing a database, in particular, network administrator requiring many individual accesses to a database relating to a communication network.

BACKGROUND OF THE INVENTION

In a communication network, a network administrator is a node associated with the network that is responsible for monitoring and configuring the operation of the network by instructing various nodes in the network to perform and to report tasks and status. Accordingly, the network administrator may have access to a database of information relating to all nodes in the network. As the number of nodes becomes large, for example, to 500,000, the amount of data accesses to the database by the administrator becomes large, requiring significant time and resources to process.

Typically, for a network administrator, a relational database management system (RDBMS) is used to process queries by the administrator. The RDBMS comprises a computer, data storage devices, disk drives and database management software, and uses relational techniques for storing and retrieving information. The RDBMS accepts commands to store, retrieve, and delete data. A well-known set of commands is based on the Structured Query Language (SQL). The constructs of SQL allow a RDBMS to provide a response to a particular query with a particular set of data for a database. SQL however does not specify the actual method to find the requested information. The method in which the query is processed affects the overall time for retrieving the data. Efficient data retrievals minimize computer and disk access times, and therefore, optimize the computational cost of doing the query.

Prior art systems access information from the database and copy retrieved information directly into a global shared buffer. Accesses to the global shared buffer populate a target data structure in the administrator. The population of the target data structure is performed at start-up of the administrator. Each access to the database is done sequentially, which collectively may require several hours to complete for a large network.

Accordingly, there is a need for a dynamic and efficient method and system for retrieving data from a database after queries are entered.

SUMMARY OF THE INVENTION

In a first aspect, the invention provides a method of retrieving data associated with a file from a database by a field name into local memory. The method comprises obtaining an address reference for a location of the field name in the file, fetching the data from the database using the field name, and utilizing at least the address reference to map the data to an address in the local memory.

The method may have the address reference utilizing an offset value of the location of the field name in the file from a beginning of the file. Further, the step of utilizing at least the address reference to map the data may further utilize a base address of the local memory.

The method may have the data associated with a first SQL structure and the address reference associated with a second SQL structure linked to the first SQL structure.

The method may have the file comprising at least one field, the field comprising at least the field name. Further the address reference may be stored in a field table, the field table comprising a list of the field(s).

The method may have the database comprising the file and another file. Further, the field table may be accessed from a file cross reference table with the file cross reference table comprising an entry referring to the field table and with the entry allowing access to the field table.

The method may allow data from another file to be retrieved and mapped into a second local memory independently of retrieval of the data from the file.

The method may have the file comprising data on a node in a communication network, with the database containing another file relating to elements in the communication network and with the local memory being associated with a processor for a network administrator for the communication network.

In a second aspect, a processing module for a query operating on a file in a database for a network administrator associated with a communication network and the database is provided. The processing module comprises local memory for storing results of the query and an address translation module. The translation module is adapted to retrieve an address reference for a location in the file of a target field associated with the query and is adapted to map the results of the query to an address in the local memory utilizing at least the address reference.

The processing module may have the address translation module utilizing the address reference and a base address of the local memory to map the results of the query to the address in the local memory.

The processing module may have the address translation module utilizing a file cross reference table. Further, the file cross reference table may comprise an entry referring to file, with the entry allowing access to a field table. Further, the field table may comprise a list of fields, with one entry in the list being associated with the target field. Further, the field table comprises an entry relating the target field to the address reference.

The processing module may allow multiple queries to be processed on multiple threads.

In other aspects of the invention, various combinations and subsets of the aspects described above are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE PREFERRED EMBODIMENTS

The description which follows, and the embodiments described therein, are provided by way of illustrating an example, or examples, of particular embodiments of principles of the present invention. These examples are provided for the purpose of explanation, and not limitation, of those principles and of the invention. In the description which follows like elements are marked throughout the specification and the drawings with the same respective reference numerals.

Figure 1:
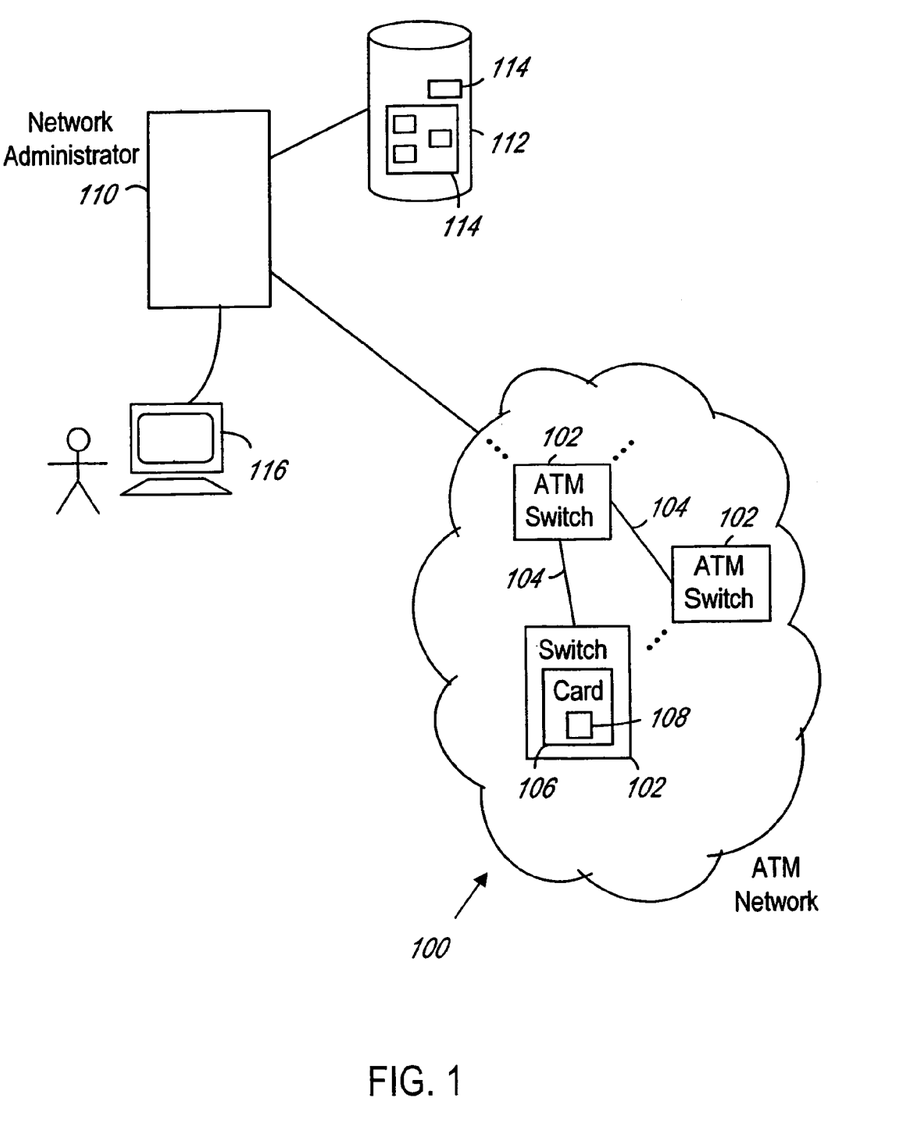
FIG. 1 is the block diagram of a communication network, a database containing configuration information about nodes in the communication network and a network administrator associated with the database and the communication network, the network administrator utilizing an embodiment of the invention.

Referring to FIG. 1, network 100 is shown. Network 100 comprises a plurality of nodes 102 which are interconnected via links 104. Network 100 may be an ATM network or another network which provides data communication routing. Within node 102, a plurality of cards 106 collectively provide the functionality for switch 104. Examples of cards 106 include line cards, control cards and fabric switching cards. Within each card 106, a plurality of electrical and mechanical circuit 108 are provided which effect the functionality for each card 106. It will be appreciated that node 102 may also be referred to as a communication switch, a network element or a switching element.

Associated with network 100 is network administrator 110. An operator of network administrator 110 can enter commands into network administrator 110 causing various link and switching configurations to be effected into network 100. Network administrator 110 comprises a computer and appropriate software to process information requests from an operator and from ATM network 100. Network administrator 110 has access to information relating to network 100 via database 112. Database 112 contains a plurality of datafiles 114, each of which contains information relating to aspects of network 100. The operator accesses network administrator via terminal 116. Network administrator may also be referred to as a network station.

As network administrator goes through its start-up routine, it must access database 112 to retrieve information contained in datafiles 114. In order to reduce the time required to access all of the information in datafiles 114, the embodiment utilizes a multi-threaded access scheme in network administrator 110 for database 112. Multi-threaded schemes, as are known in the art, provide independent threads to be spawned. Therein, each thread independently accesses database 112, stores information in a global storage location and then transfers the data to a local memory location. Typically, threads are grouped together and thread groups will operate on a separate CPU (not shown) within network administrator 110. Each CPU in network administrator 110 may also have its local memory as RAM. In providing multiple threads, network administrator 110 must ensure that the data retrieved by each thread is valid. It will be appreciated that multiple threads may be accessing the same datafile 114 in database 112 and one thread may write to a location in the global storage location which may cause data inconsistencies if the write operation is performed before another thread is able to read the location and transfer the data to its local memory.

Accordingly, the embodiment does not utilize a global storage location and instead utilizes local memory for a local target data structure for thread. Data is retrieved by each thread directly into its local data structure.

Figure 2:
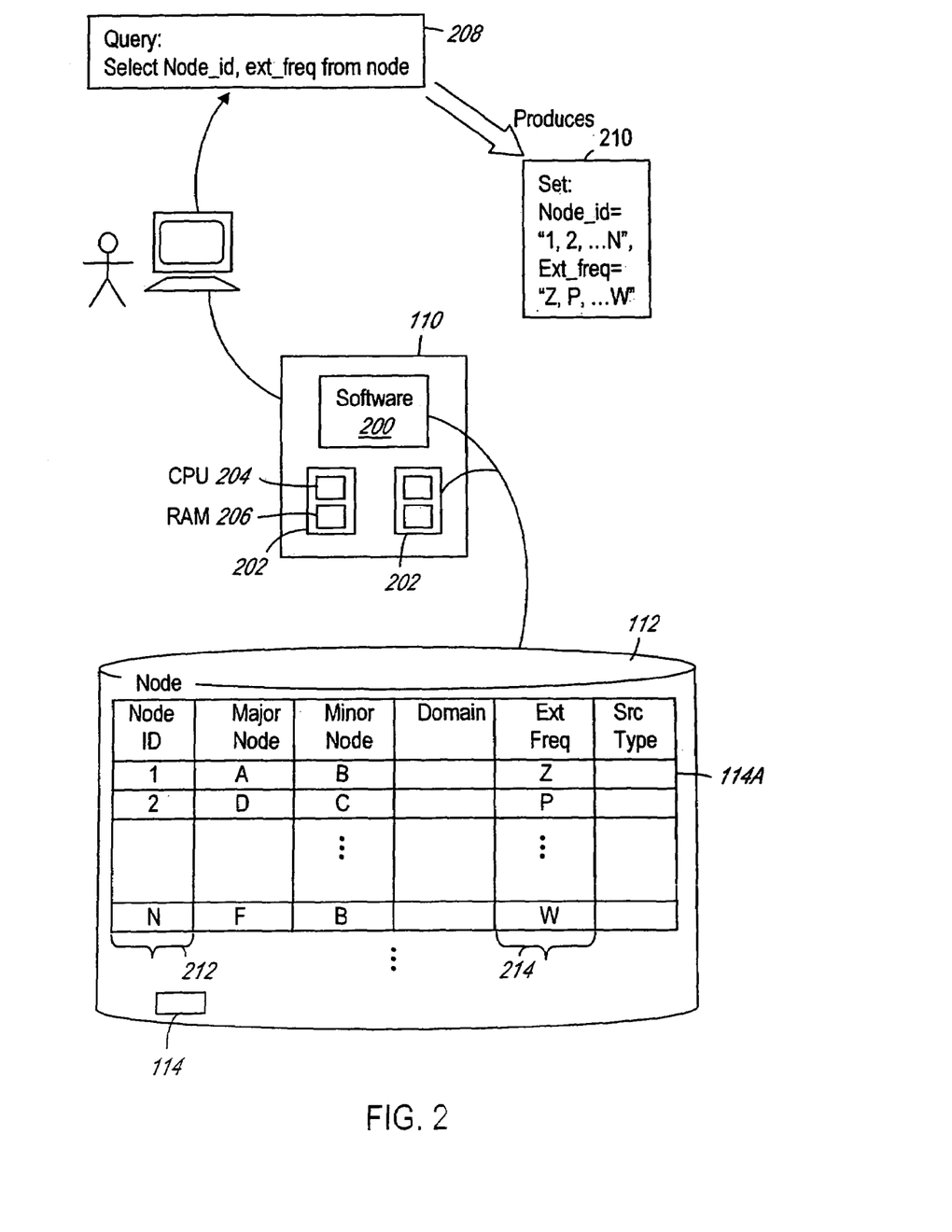
FIG. 2 is a block diagram of an operator of the network administrator accessing tables stored in the database utilizing the embodiment of FIG. 1.

Referring to FIG. 2, network administrator 110, containing the embodiment, is shown accessing database 112. Within network administrator 110, application software 200 operates, allowing the operator to access database 112. Database 112 contains a series of datafiles 114. Each datafile 114 contains information on aspects of network 100. For example, datafile 114A in database 112 is a table of all nodes 102 in network 100. For each node 102, datafile 114A includes its node identification, its associated major node, its associated minor node, its domain, its external frequency and its source type. Application 200 is associated with threads 202 which have been spawned to instantiate separate database accesses. Each of application 200 and threads 202 may operate a separate CPU 204 having local RAM 206 in network administrator 110. It will be appreciated that application software 200 and threads 202 operate together to provide access to database 112. Accordingly, unless otherwise noted, any descriptions regarding the functionality of application software 200, implicitly include the functionality of threads 202, which operate within the application software.

In using network administrator 110, operator may require certain information about a node 102 within network 100. The information may be stored within one or more datafiles 114. In requesting the information, operator (or application software 200) would generate a query for information. The query is formatted by application 200, and aspects of the query are effected to retrieve relevant information from datafiles 114 and store the results in local RAM 206. Accordingly, if the operator causes query 208 to be issued, namely "Select Node_id, ext_freq from node", application software 200 will generate a thread to process an access to database 112 and its datafiles 114 to complete the query. In processing query 208, information from a datafile 114 is extracted in rows, one row at a time per access and one value from each column will be returned per access time. In datafile 114A, the values for "Node_id" are taken from the row "1, 2, . . . N" from column 212 and the values for "ext_freq" are taken from the row "Z, P . . . W" from column 214. Accordingly, for set 210, at the first data fetch, the extracted values for "Node_id" is "1" and the extracted value for "ext_freq" is "Z". Next, at the second data fetch, the extracted values for "Node_id" is "2" and the extracted value for "ext_freq" is "P". The sequential fetching continues until the last data fetch, where the extracted values for "Node_id" is "N" and the extracted value for "ext_freq" is "W". The results of set 210 are stored in local RAM 206 a single column at a time, relating to the calling thread 202. Accordingly, for each thread 202, the results of its set 210 are dynamically mapped into its local RAM 206.

Figure 3:
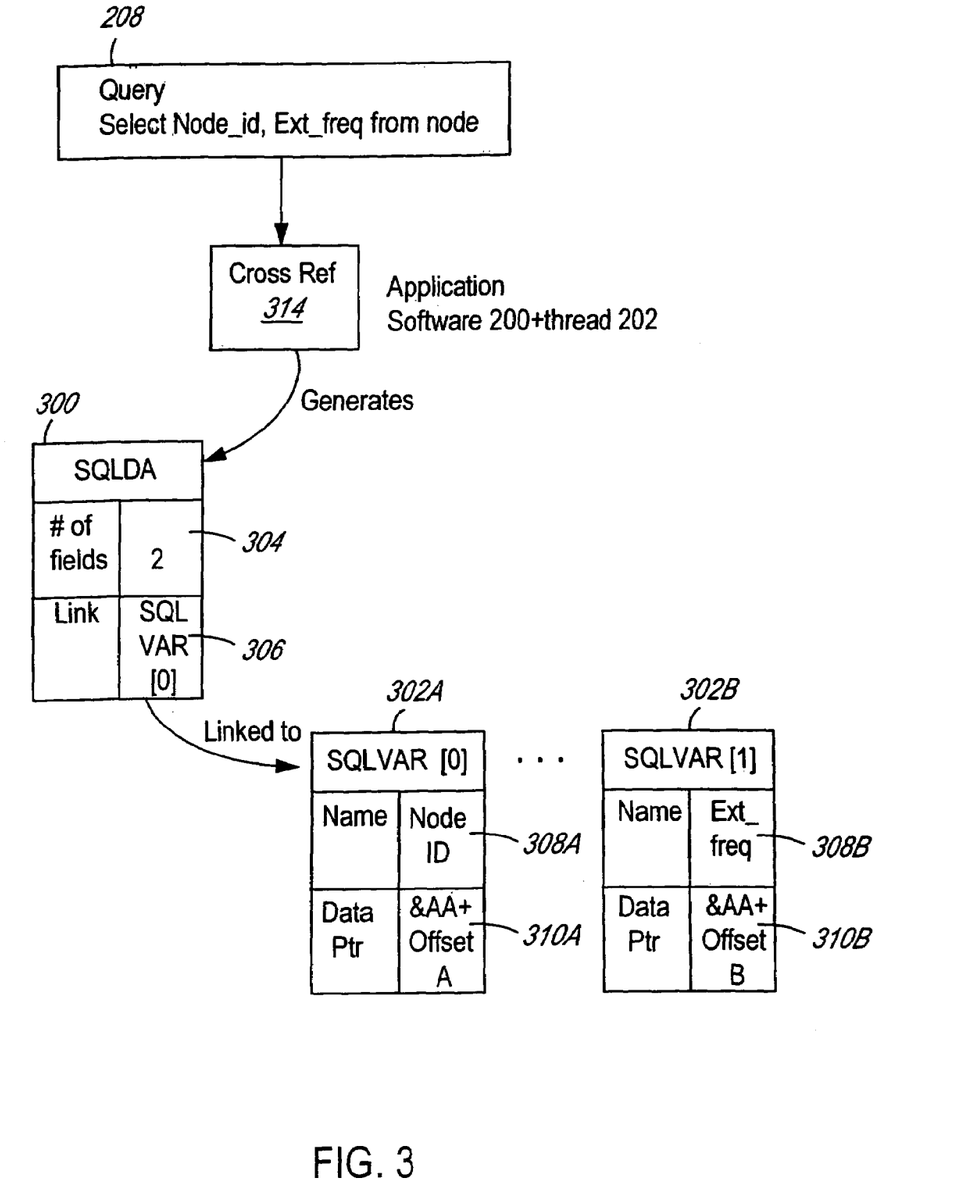
FIG. 3 is a block diagram of SQL data structures associated with the database utilizing the embodiment of FIG. 1.

Referring to FIG. 3 and as shown above, in the embodiment, queries 208 are constructed in SQL, a known industry standard. In the embodiment, an Informix (trade-mark of IBM) database engine is utilized which follows SQL standards. Initiation of query 208 causes the generation of a "sqlda" structure 300 and a "sqlvar" structure 302 and application software 200 allocates memory for the sqlda structure 300 and for an array of sqlvar structures 302 within the sqlda structure 300. The structures are stored in local RAM for a thread 202. The sqlda structure 300 contains information pertaining to a single query 208. The sqlda structure 300 permits use of queries involving unknown field returns and database field requests. Sqlda structure 300 has number field 304 containing the number of fields associated with the query, and link field 306 which identifies a link, i.e. pointer, to a sqlvar structure 302. A sqlvar structure 302 contains information relating to a single database field. The sqlvar structure 302 essentially is an array of elements containing information about the fields in the "select" clause of query 208. Each sqlvar structure 302 has an identity field 308, identifying the field of from the datafile 114 and an address pointer field 310, containing a calculated address pointer to an address for the field in datafile 114 associated with that sqlvar structure 302 being accessed by query 208.

To illustrate use of the sqlda structure 300 and sqlvar structure 302, an example is provided for query 208, "Select Node_id, ext_freq from node", where it has been entered into terminal 116. In processing query 208, the Informix API parses query 208 and establishes two fields, "node_id" and "ext_freq" as the target fields for data from the appropriate datafile 114A. the Informix API builds the appropriate sqlda and sqlvar structures 300, 302. The Informix API then fills number field 304 of sqlda structure with "2", and link field 306 with "sqlvar[0]". For query 208, as there are two fields which have to be accessed, two sqlvar structures 302 are generated, namely sqlvar[0] structure 302A and sqlvar[1] structure 302B. The Informix API also fills identity field 308A with "node_id" and field 308B with "ext_freq".

During runtime, application software 200 fills address field 310A with an appropriately calculated address pointer which is generated from a base address for the data structure associated with the result for the query in local RAM 206 for "node" (here "&AA"), adjusted by an address offset value (here "A") to point the pointer to the "node_id" field in the data structure in local RAM 206. Similarly, application software 200 fills address field 310B with a calculated address pointer to point to the address for "ext_freq" field in the data structure in local RAM 206 (here, base address is "AA" and offset is "B"). A mapping structure 314 is accessed by application software 200 to populate sqlvar structure 302 with address values for field 310. The use of mapping structure 314 and the address values for field 310 provide a dynamic mechanism of mapping a row for a datafile 114 into a template which is stored in local RAM 206 and is used by a thread 202 for its queries 208.

Figure 4A:
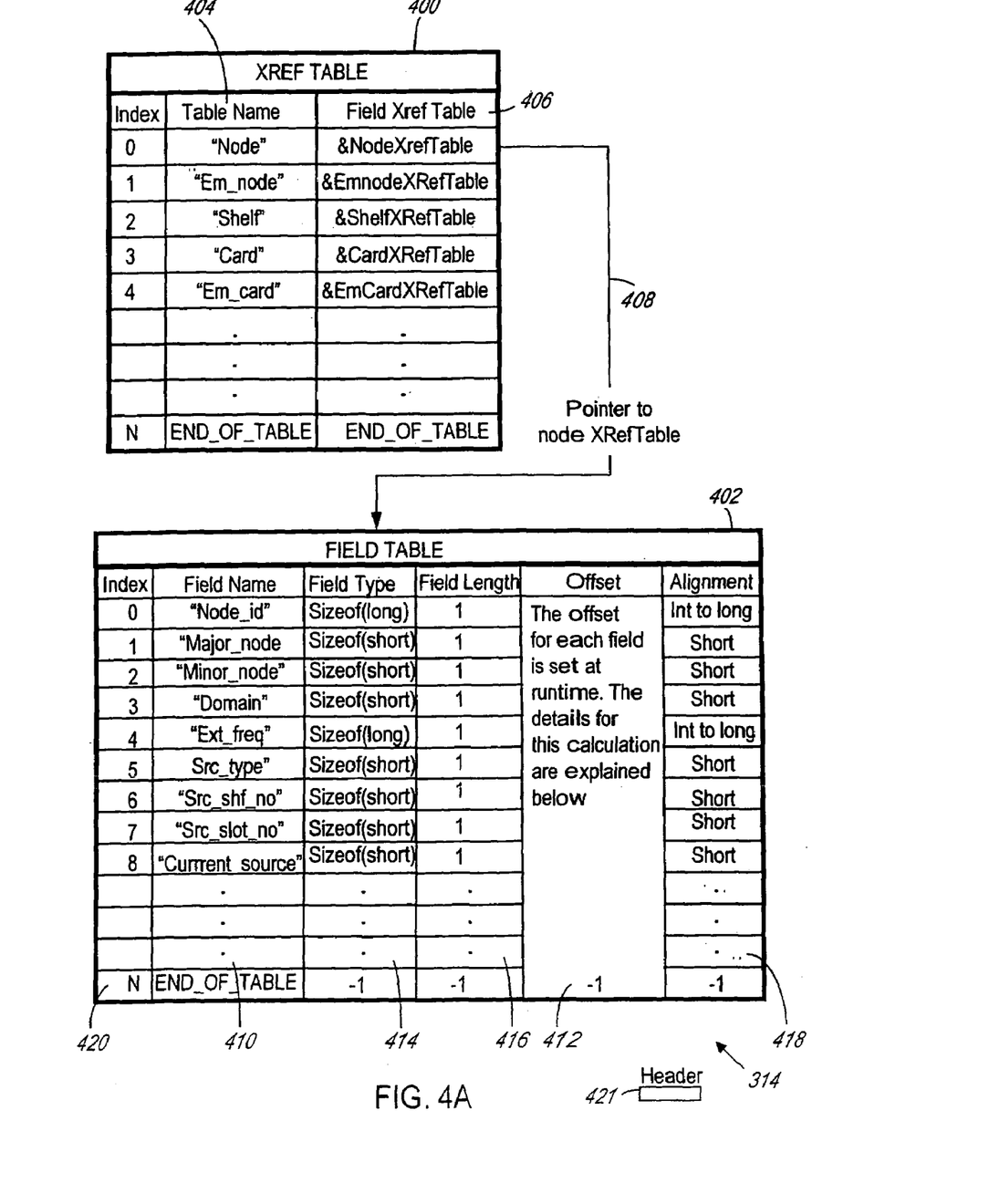
FIG. 4A is a block diagram of a mapping structure utilized in the embodiment in the network administrator of FIG. 3.

Referring to FIG. 4A, detail on mapping structure 314 is shown. Mapping structure 314 allows mapping of fields (e.g. fields 212 and 214) of a datafile 114 (e.g. datafile 114A) to an address offset value which can be used by sqlvar structure 302. Mapping structure 314 consists of two types of data structures: cross-reference (Xref) table 400 and field table 402. Xref table 400 contains a table name list 404 and address list 406. Each entry in table name list 404 is one of the datafiles 114 in database 112. For example, in table name list 404, the entry for "node" corresponds to the "node" datafile 114A. For each entry in table name list 404, the corresponding entry in address list 406 provides an address identifying a memory location for a field table 402 related to, but not pointing directly to, that particular datafile 114. For example, for entry "node" in table list 404, the corresponding entry in address list 406 is "&node XrefTable", which provides an address to field table 402 as indicated by arrow 408. Note that "&node XrefTable" is not an address to the actual location of the "node" datafile 114A. In the embodiment, mapping structure 314 is stored in memory accessible by application software 200. In processing a query, each thread 202 can access mapping structure 314, but preferably, cannot write to it. The mapping structure may be stored in the global address space for the software application 200.

Each field table 402 contains a name list 410 of field names contained its associated datafile 114. As shown in FIG. 4A, for that example, in field table 402, name list 410 comprises "Node_id, Major_node, Minor_node ... Current_source", corresponding to the field names of datafile 114A. For each entry in name list 410, there is a corresponding entry in offset list 412 providing an address offset value for entries for field name from the base location address of datafile 114. An offset value is calculated at runtime of application software 200 which is used to provide a relative offset value to identify the local location of an entry originally provided from datafile 114, but stored in a local data structure in local RAM 206 for a given thread 202. Entries in the local data structure may have only selected entries from the original datafile 114. The entries in the local data structure are not necessarily located at sequential locations. The offset value is a byte-numbered offset value. Further detail on the calculation of offset values is provided below. The final entry in the field table 402 contains the size of the data structure associated with the database table. This value is calculated at the same time as values for offset field 412.

Other fields in field table 402 include: a) FieldType 414 which contains the size of the data type associated with the field when the results are transferred to the local storage 206; the value is set at compilation of the application software 200; b) FieldLength 416 which contains the number of elements of FieldType 414; c) AlignmentCorrection 418, which contains a shift value, in bytes, needed to align value for the field name 410 when the results are transferred to the local storage 206.

The end of field table 402 is indicated by non-existent, logical row 420, where each field is populated with an end-of-field value ("−1" or "end of table").

The field table 402 structure allows expansion for multiple Xref tables 400 for the same database table. This allows data from a single database table to be returned in a variety of different formats including data structures used by application 200.

Referring back to calculation of offsets 412, in order to provide an accurate mapping for location of results in local RAM 206, offsets 412 in Xref table 402 must be initialized with the correct offset value for each field member. Offsets 412 are calculated at runtime of application software 200 to minimize issues with translation of data sizes when going through the operating system associated with application software 200. The offset value for the first entry in offset field 412, corresponding to the first entry in name field 410 is set to "0", as there is no offset from the beginning of the data structure in local RAM 206. However, the initial offset value may be changed if there is a need to align the address of the location identified by the resulting base address to the data structure in local RAM 206, modified by the offset value for the first entry. (Further detail on alignment is provided below.) For each subsequent entry in Xref table 402, each offset value is calculated as follows:

1. The offset value of the preceding entry is retrieved into a calculated offset value.
2. Any previous alignment correction value is subtracted from the calculated offset value. The adjustment provides a base address of the previous field address.

3. The calculated offset value is added to the value of the (field type value x field length value) of the entry.
4. It is determined whether any nested structures are associated with the entry. If the entry exists perform a compiler-based word alignment on the calculated offset value using the alignment value for this entry in field table 402 and proceed to step 6. Further detail on nested structures is provided below.
5. Perform a word alignment on the calculated offset value using the data type value for the entry retrieved from the field table 402.
6. Insert the calculated offset value for the entry in field table 402.

Referring back to alignment correction, alignment correction of data is required when there is a mismatch of data types between the database tables and the application variables. A misalignment causes a pointer misalignment of the data pointer for the variable associated with the local data structure relating to the set 210 stored in local RAM 206. If there is improper address alignment, the information from datafile 114 will be inserted into the wrong memory address of for the local data structure in local RAM 206.

Word alignment of a variable is performed by the compiler of application software 200 utilizing the data type of a variable. Generally, at compile time, an address of a storage element is aligned to an address where the address of a storage element divided by the size of the variable is an integer (i.e. (&dataRecord) % (sizeof(dataRecord))=0).

Further, in order to provide an accurate mapping of datafiles to local data structures in local RAM 206, a header file 421 is provided which contains tables 421A . . . N. Header file 421 is accessible application software 200. Header file 421 is a list of all field names for all datafiles 114. Each field name is cross-referenced with the data type of the target variable for the local data structure to be used in local RAM 206. Header file 421 has the fields listed in the same order as they appear in the data structure used in the local RAM 206. A mapping of any nested data structures contained in the data structure must also be provided.

Figure 4B:
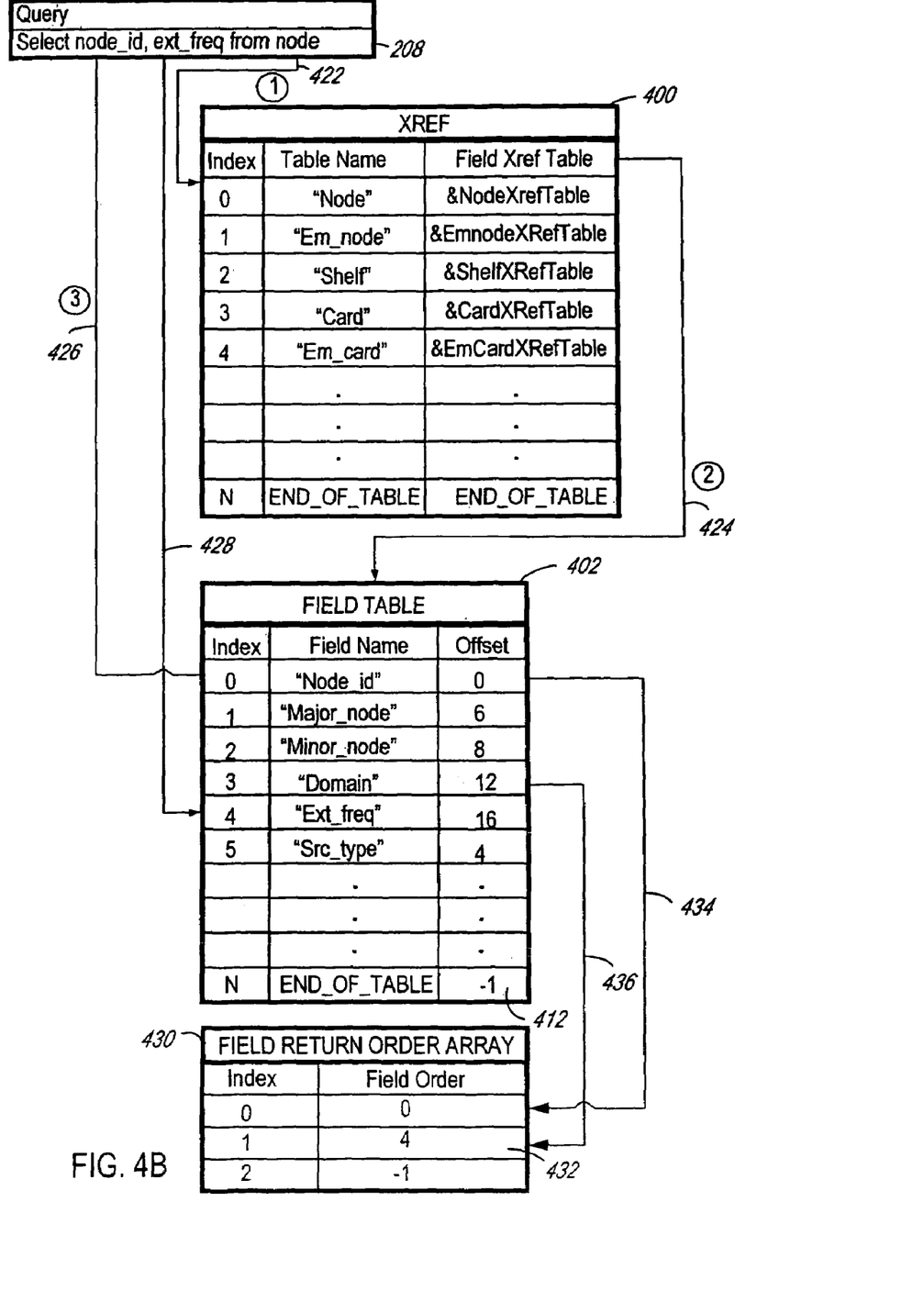
FIG. 4B is a block diagram of an example of the mapping structure associated with a SQL query executed in embodiment of FIG. 4A.

Referring to FIG. 4B, an example of the use of mapping structure 314 is provided. For query 208, "Select Node_id, Ext_Freq from node", the "From" and "Select" clauses are scanned by application software 200. For the "from" clause, it is scanned to identify the source datafile 114, i.e. "node". This allows application software 200 to make an address link to the correct entry in Xref table 400, as shown by arrow 422, associating "node" in query 208 to the "node" entry in table name field 404 of Xref table 400. The corresponding entry in address list 406 ("&nodeXRefTable") provides a base address for the location of the corresponding field table 402, as shown by arrow 424. For the "select" clause, once the application software identifies the appropriate field table 402 for query 208, the attributes of the "select" clause can be linked to their associated fields in field table 402. Accordingly, for the attribute "node_id", it is associated with the first entry in field table 402, as indicated by arrow 426. For the attribute "ext_freq", it is associated with the fifth entry in field table 402, as indicated by arrow 428. Further, for each of attributes "node_id" and "ext_freq", its offset value in field 412 ("0" and "12", respectively) provides the offset value of an address for that attribute from the base address of the location of set 210 in local RAM 206.

Associated with field table 402 is field order return array 430. Field order return array 430 provides an indexed list of field order values in list 432 related to field table 402 for entries in field table 402 which are being accessed by query 208. The list can quickly be traversed to retrieve an index location for an attribute in field table 402 which has been targetted in a query 208. For example, for the first attribute of the "select" clause for query 208 ("Node_id"), the first entry in field order array 430 ("0"), identifies the index location for the attribute in the associated field name table 412, as shown by arrow 434. Similarly, second attribute of the "select" clause ("ext_freq") is associated with the second entry in field order array 430 ("4"), identifying the index location for the attribute in the associated field name table 412 (index value "4"), as shown by arrow 436. The field order return array 430 may also be used for multiple queries that only differ by qualification or order clauses. To reuse the field order return table 430, it is necessary that the field order for a subsequent query is identical to the previous query.

Figure 4C:
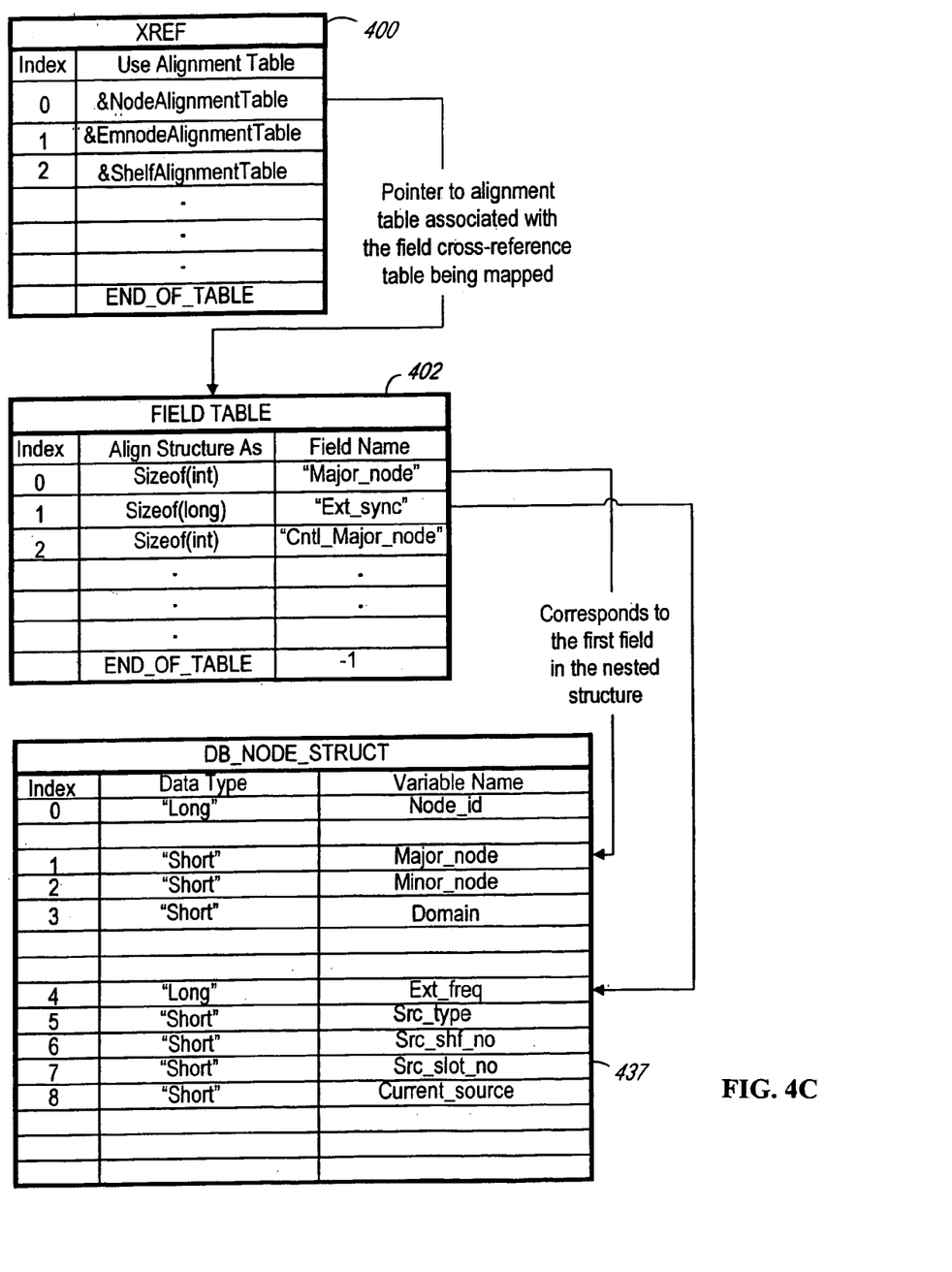
FIG. 4C is a block diagram of the mapping structure with a nesting structure utilized in the embodiment in the network administrator of FIG. 4A.

Referring to FIG. 4C and again to nested structures, the embodiment provides a nesting structure to allow nesting of substructures with field table 402. Nested structure alignment boundary table 437 provides a temporary mapping of data structures in the local RAM 206. This allows nested structure alignment within local RAM 206 to be calculated ensuring correct mapping of a field name in datafile 114 to its namesake in data structure in local RAM 206. Boundary table 330 lists the field name of datafile 114 that is associated with the first variable in any nested data structure in local RAM 206 and lists the data size to which the nested data structure must word align. Boundary table 437 is used to properly calculate the offset value for the field Xref tables.

It will be appreciated that mapping structure 314 may be used in other embodiments which do not use SQL constructs, let alone Informix SQL constructs. Mapping structure 314 provides data-centric data mapping and data format conversion of data in datafiles 114 in database 112 to local structures in local RAM 206. In the construct of the embodiment, as results of query 208 are retrieved from datafile 114 in database 112, they can be stored at dynamic locations in local RAM 206. For example, for query 208, the first attribute ("node_id") is retrieved from datafile 114 from database 112 into the memory block allocated to store the results in local RAM 206. The information retrieved from datafile 114 for "node_id" will be stored at the location within a buffer space specified by the field table 402 offset value for "node_id". This value is retrieved using the table value in row 432 in Field Return Order Array table 430 at index 0 as an index into the fields of field table 402. This will produce the offset value of "0" for "node_id" and "12" for "ext_freq". Accordingly, from a single call to fetch values from database 112 for "node_id" and "ext_freq", the results are stored in the memory block allocated in local RAM 206 at 0 bytes and 12 bytes from the beginning of the memory block.

In order to provide a standarized interface for mapping structure 314, aspects of the Informix API are used to access the mapping structure 314. In particular, to improve the efficiency of the embodiment, data retrieved from a datafile 114 is directly associated with the target variable in the data structure in the local RAM 206 that uses the data. To achieve this, a data pointer for each of the Informix sqlvar structures within the sqlda structure are provided by the embodiment with the correct address of the target variable. Accordingly, the memory location in the local RAM 206 of the target variable is bound to a single database field.

Figure 4D:
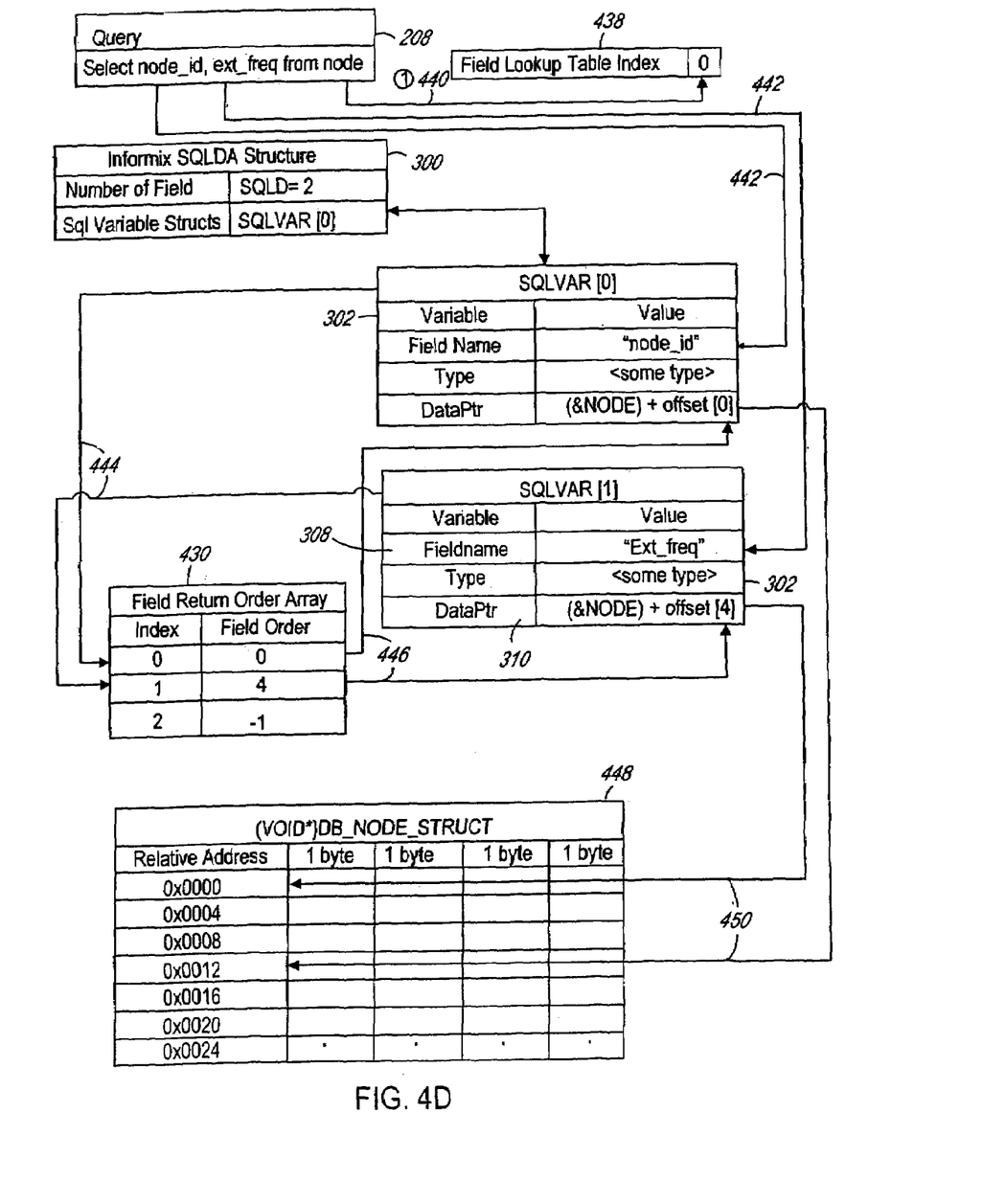
FIG. 4D is block diagram of the SQL data structure of FIG. 3 with and a global SQL structure.

Referring to FIG. 4D, to bind a target variable to a field in a table in datafile 114, the embodiment performs the following steps.

First, from SQL query 208, the name of datafile 114 is determined to identify the corresponding field table 402. To accomplish this identification, the attribute in "from" clause ("node") can be used in Xref table 400 or alternatively, field table index 438 which contains a list of all datafiles 114 and an index value to an entry in Xref table 400 for a particular database table. This step is shown by arrow 440.

Next, SQL query 208 is described into a sqlda structure 300. The sqlda structure 300 will return an ordered structure array of sqlvar structures 302 which contain the field names 308 relating to the attributes selected from targeted fields in datafile 114. This step is shown where sqlda structure 300 is created and its number field is populated with the value "2", relating to the number of attributes in the "select" clause in query 208. Also, sqlvar structures 302 are each created and their identity fields 308 are populated. This step is shown by arrows 442.

Next, for each sqlvar structure 302, each identity field value 308 is used with field table index 438 to build a field order return array 430. This step is shown by arrows 444.

Next, for each sqlvar structure 302, the values for each address pointer field 310 are calculated. From field order array 430, an index value into the field table 402 for the corresponding sqlvar structure 302 is determined. This index is used with field table 402 to retrieve an offset value (412) corresponding to the database table field. This offset is added to the value of the base address of the data structure in local RAM 206 to determine the absolute offset of the corresponding field name. This is shown by arrows 446.

Finally, each absolute offset is copied into a global sqlvar structure 448 to a data pointer corresponding to the index value of the entry in field order return array 430 for that sqlvar structure 302. This is shown by arrows 450.

Once a section of local RAM 206 for a thread 202 is bound to an sqlda structure 300, all subsequent calls to a datafile 114 will return the information into the same locations in local RAM 206. The field order return array 430 may also be reused on multiple queries to the same datafile 114. However, the queries must maintain the same field list and may only differ by the where and/or order by clause. Reuse of entries in field order return array 430 requires that the field order does not differ between queries.

Referring to FIGS. 4A, 4B and 4D another use of field order return array 430 is described. Field field return order array 430 contains field table 402 indexes for data retrieved from a datafile 114. Each field value is returned from the datafile 114 to a memory location in local RAM 206 specified in a data pointer generated from the data pointer field 310 of a sqlvar structure 302. As each member of sqlvar structure 302 is associated with a specific field for datafile 114 and that field is named in name field 308 of the sqlvar structure 302, it is possible to ascertain which variable for the data structure for local RAM 206 will be used for each data pointer 310 in sqlvar structure 302, by matching the contents of name field 308 of the sqlvar structure 302 to the corresponding entry in field lookup table 438.

Figure 4E:
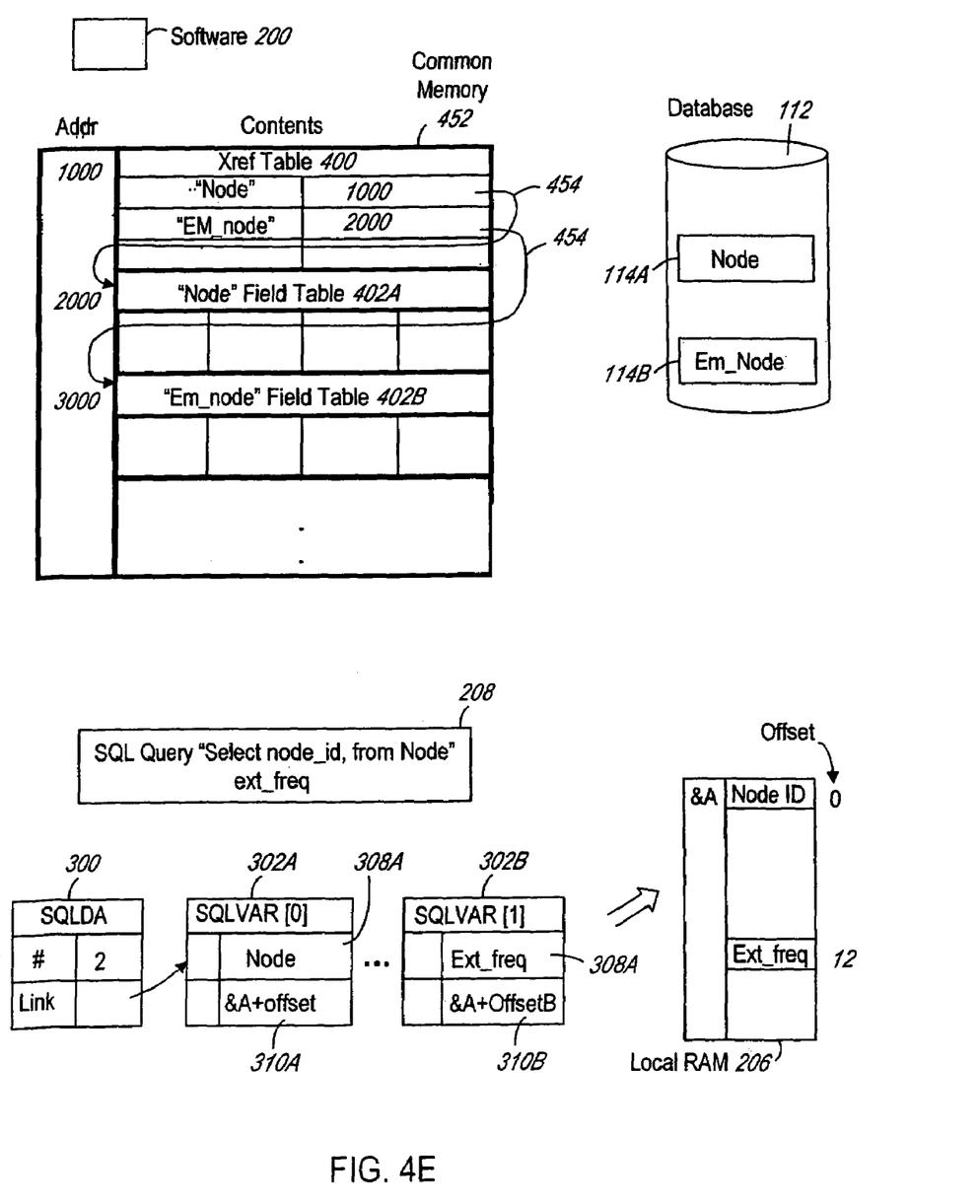
FIG. 4E is block diagram relating the SQL data structure of FIG. 3 with the mapping structure of FIG. 4A.

Referring to FIGS. 4B and 4E, a description of the associations amongst database 112, datafiles 114, application software 200, common memory 452, mapping structure 314, Xref table 400, field name table 402, SQL query 208, sqlda structure 300, sqlvar structure 302 and local RAM 206 is shown.

As noted earlier, database 112 contains datafiles 114. To facilitate accesses to datafiles 114, application software has mapping structure 314 stored in a application global memory 452. Global memory is associated with the application software 200. Entries in Xref table 400 are linked to addresses of field name table 402 in common memory 452, as shown by arrows 454.

In processing query 208, sqlda structure 300 and sqlvar structure 302 are built by the Informix API. Next, application software 200 calculates values in data pointer field 310 of sqlvar structure 302. The values are calculated to be an offset from a base address in local RAM 206 for thread 202 utilizing mapping structure 314. For sqlvar 302A, the offset for node_id is 0; for sqlvar 302B, the offset for ext_freq is 12. Accordingly, in local RAM 206, beginning at the base address, each entry is related to a sqlvar structure 302 and its sqlvar structure contains the calculated offset for the entry from the base address of local RAM 206 into the appropriate field.

Accordingly, in accessing data from datafile 114, application software can determine what attributes are necessary for a query 208, then retrieve it from datafile 114, then directly copy the value into the mapped location for the attribute in local RAM 206.

Figure 5:
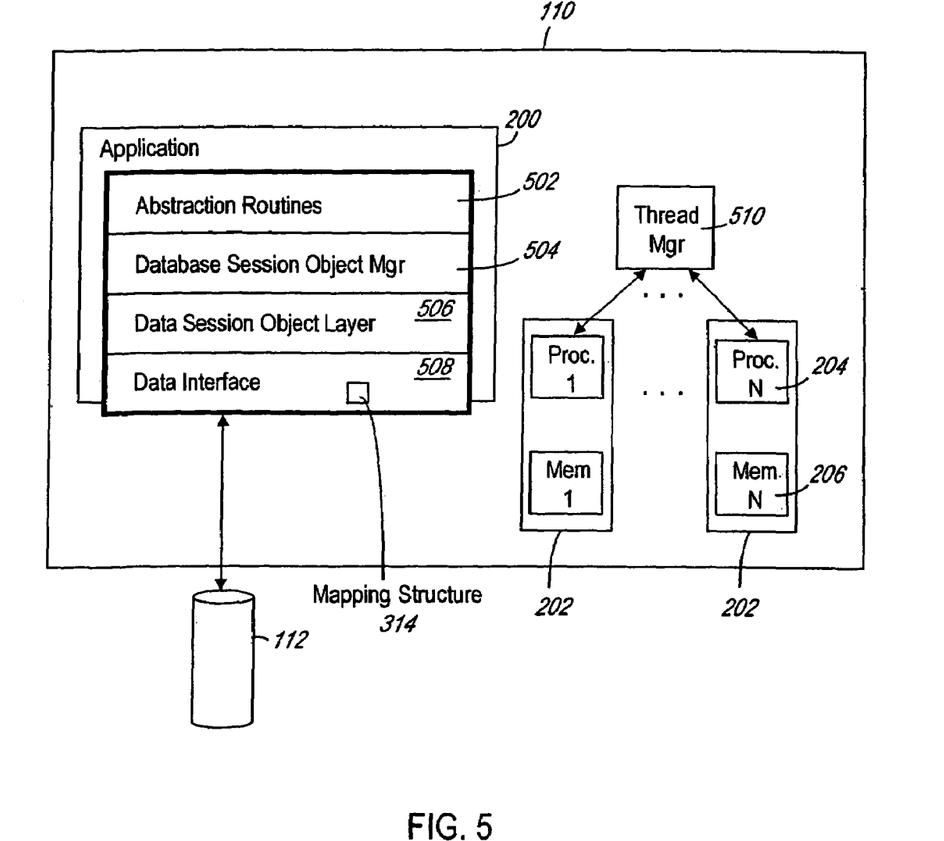
FIG. 5 is a block diagram of relationships between the data structures of FIGS. 4A, 4B, 4C and 4D and a query entered by the operator of the network administrator for the embodiment of FIG. 1.

Referring to FIG. 5, further detail on application 200 and threads 202 in network administrator 110 is shown. Application 200 comprises an Abstraction Module 502, a database Session Object Manager Module 504, a Database Session Object Module 506 and a Database Interface Module 508. The modules provide a series of hierarchical layers allowing abstraction of information and processing between modules. Aspects of each module are described in turn, beginning with Database Interface Module 508. Database Interface Module 508 contains information and functions necessary to access a field in any supported datafile 114 in database 112. In Database Interface Module 508, application 200 can execute any single table query for database 112 (such as query 208), returning any number of fields into the local RAM 206 associated with that table. The functionality of the embodiment relating to mapping structure 314 described above occurs in Database Interface Module 508. In the embodiment, each module is a software module, written in C++.

Database Session Object Module 506 abstracts administrative details, such as statement and cursor management, from the database access process. Persistent data is stored in this module. At this level a single connection can be made and broken, queries can be executed and records can be retrieved without any knowledge of connection names, statement ids or sqlda structures. The information and data structures required to perform these tasks are stored within the session object.

For Database Session Object Module 506, a database session class contains all of the information required to make a single database connection, prepare and execute a query and retrieve information from the database. Most of the information stored in the class is used to provide argument values for the Database Interface Module 508 to provide an abstract view of the Informix API.

The database session does allow all aspects of the connection and query to be contained in a locally defined class in a local format. The following Table A outlines the steps required to perform a specific task in the Database Session Object Module 506 and the Database Interface Module 508.

TABLE A

| Task to Perform | Database Session Object Module 506 | Database Interface Module 508 |
|---|---|---|
| Connect to database | Make call to open session and check return code. | Generate and save Unique connection Id. Make call to connect and check return code. |

TABLE A-continued

| Task to Perform | Database Session Object Module 506 | Database Interface Module 508 |
|---|---|---|
| Prepare a query for data fetch | Make a call to set session query and check return code. | Generate and save a unique cursor Id Generate and save a unique statement Id Make a call to open database cursor and save sqlda struct*. Make a call to get database table name and save name. Make a call to set column order and save column order table and table Id. |
| Retrieve first row returned from query. | Make a call to get next row. | Bind sqlda struct to record memory buffer (requires: table Id, column order table, sqlda struct) Make a call to get next row. |

Several of the state member variables contained within the class may be programmed to detect possible errors. The other state member variables contained within the class are used by the Database Session Manager layer to allow the session manager to query the session status, and instruct the session to behave in a specific manner.

Database Session Object Module 506 is limited to one active query per session object, making multiple session object management essential. This task is performed by the session manager object.

Next, Database Session Object Module Manager 504 manages multiple concurrent database session while providing the functionality required to support multi-threaded database access. The functionality of Database Session Object Module Manager 504 is identical to that of the Database Session Object Module 506. However, Database Session Object Module Manager 504 is able to control multiple sessions at once, allowing multiple queries 206 to be performed simultaneously. Each of these queries can then be accessed through Database Session Object Module Manager 504 using a session identifier associated with the query.

When a new session is requested, Database Session Object Module Manager 504 will search through the session list until a free session is located. The free session will be allocated and a session identifier will be returned.

Database Session Object Module Manager 504 controls a group of database session objects 506. Each of the session objects can be assigned a command or query by the Database Session Object Module Manager 504. Once a session has been assigned a task, the object is responsible for all aspects of that task until such time as another task is assigned. Further instructions related to the assigned task are forwarded by Database Session Object Module Manager 504 to the responsible session using the assigned session identifier.

Next, thread management routines 510 simplify the use of thread control structures and critical section control for multi-threaded applications. Thread management organization is based on a dynamic list of thread control structures. These structures are used to synchronize thread initialization, execution and termination.

The thread control structure contains all information required for initialization and management of a single thread. This structure is dynamically allocated and stored in a single linked list as requests for new threads are handled.

The abstraction module 502 is contained within a single database access class. The abstraction module 502 contains database abstraction routines, which are a number overloaded functions contained within a database access class. Each frequently accessed database record has a set of methods which overload the basic functionality to suit the specific table requirements.

It will be appreciated that the initialization of network administrator 110 can be performed on a single thread or on multiple threads using the data structures and modules defined above.

It will be appreciated that the embodiment enables a data retrieval system in which the order of information being retrieved does not have to be known. The retrieved information is organized and stored depending on the field name of each field. Further, data can be stored in any memory buffer. The memory buffer can be switched to a different memory location.

It is noted that those skilled in the art will appreciate that various modifications of detail may be made to the preferred embodiments described herein which would come within the scope of the invention as described in the following claims.

We claim:

1. A method of providing rapid access to data stored in a database to permit said data to be loaded into an administrator computer for runtime storage, said method comprising:
   creating multiple threads for a query to concurrently retrieve data corresponding to the query from said database, wherein said database contains a plurality of datafiles of information about a communication network;
   retrieving data corresponding to the query and mapping, using a mapping structure, the retrieved data from said database into entries of local data structures stored in a local memory of the administrator computer, wherein each local data structure is associated with a respective thread,
   wherein said mapping structure includes a cross reference table and a plurality of field tables,
   wherein the cross reference table contains a list of the plurality of datafiles in said database and a list of addresses of the plurality of field tables,
   wherein each field table contains a list of field names in each datafile.

2. The method as claimed in claim 1 wherein said field tables map fields in a particular datafile of said database to an address offset value in relation to a base location address of that datafile.

3. The method as claimed in claim 2 wherein said retrieved data is associated with a SQL structure.

4. The method of claim 1, wherein said administrator is a network administrator node, and said datafiles contain information about a communication network.

5. The method as claimed in claim 4 wherein:
   said retrieved data relates to a node in said communication network;
   said database further contains other data relating to elements in said communication network; and
   said local memory is associated with a processor of the network administrator node.

6. The method as claimed in claim 5 wherein said query is performed during initiation of the communication network to obtain configuration data related to said elements.

7. The method as claimed in claim 6, wherein said configuration data relates to a node in the communication network.

8. The method as claimed in claim 5, wherein said method is executed as a series of steps by computer executable code operating on said processor.

9. The method as claimed in claim 8, wherein said query is processed by a plurality of separate threads spawned by said computer executable code.

10. The method as claimed in claim 8, wherein said query comprises SQL statements.

11. A system for providing rapid access to data stored in a database in a communication network to permit said data to be loaded into an administrator computer for runtime storage, said system comprising:

multiple processors;

multiple local memories; and an application:

creating multiple threads for a query to concurrently retrieve data corresponding to the query from said database, wherein said database contains a plurality of datafiles of information about the communication network; and retrieving data corresponding to the query and mapping, using a mapping structure, the retrieved data from said database into entries of local data structures stored in a local memory of the administrator computer, wherein each local data structure is associated with a respective thread, and wherein said mapping structure includes a cross reference table and a plurality of field tables, wherein the cross reference table contains a list of the plurality of datafiles in said database and a list of addresses of the plurality of field tables, wherein each field table contains a list of field names in each datafile.

12. The system as claimed in claim 11, wherein said field tables map fields in a particular datafile of said database to an address offset value in relation to a base location address of that datafile.

13. The system as claimed in claim 12, wherein said retrieved data is associated with a SQL structure.

14. The system of claim 11, wherein said administrator computer is a network administration node, and said datafiles contain information about a communication network.

15. The system as claimed in claim 14, wherein:

said retrieved data relates to a node in said communication network;

said database further contains other data relating to elements in said communication network; and said local memory is associated with a processor of the network administrator node; and said query is performed during initiation of the communication network to obtain configuration data related to said elements.

16. The system as claimed in claim 11, wherein said query is processed by a plurality separate threads.

17. The system as claimed in claim 11, wherein said query comprises SQL statements.

* * * * *